(12) United States Patent
Cui et al.

(10) Patent No.: US 12,286,049 B2
(45) Date of Patent: Apr. 29, 2025

(54) VEHICLE-MOUNTED GAS TURBINE GENERATOR SET

(71) Applicant: YANTAI JEREH PETROLEUM EQUIPMENT & TECHNOLOGIES CO., LTD., Shandong (CN)

(72) Inventors: Qili Cui, Shandong (CN); Wanchun Zha, Shandong (CN); Yichao Mou, Shandong (CN); Ting Zhang, Shandong (CN); Lining Xu, Shandong (CN); Qiong Wu, Shandong (CN); Jianglei Zou, Shandong (CN); Fulun Bi, Shandong (CN); Ning Feng, Shandong (CN); Honly Wang, Shandong (CN); Haibo Zhang, Shandong (CN)

(73) Assignee: YANTAI JEREH PETROLEUM EQUIPMENT & TECHNOLOGIES CO., LTD., Shangdong (CN)

( * ) Notice: Subject to any disclaimer, the term of this patent is extended or adjusted under 35 U.S.C. 154(b) by 156 days.

(21) Appl. No.: 17/422,847

(22) PCT Filed: Apr. 27, 2021

(86) PCT No.: PCT/CN2021/090269
§ 371 (c)(1),
(2) Date: Jul. 14, 2021

(87) PCT Pub. No.: WO2021/218969
PCT Pub. Date: Nov. 4, 2021

(65) Prior Publication Data
US 2022/0258659 A1  Aug. 18, 2022

(30) Foreign Application Priority Data

Apr. 28, 2020 (CN) .......................... 202010350528.7
Apr. 28, 2020 (CN) .......................... 202020676605.3

(51) Int. Cl.
*B60P 3/00* (2006.01)
*B60G 15/06* (2006.01)
(Continued)

(52) U.S. Cl.
CPC ................ *B60P 3/00* (2013.01); *B60G 15/06* (2013.01); *B60G 15/12* (2013.01); *B60S 9/10* (2013.01);
(Continued)

(58) Field of Classification Search
CPC . B60P 3/00; B60G 15/06; B60G 15/12; B60S 9/10; F02C 6/00; F02C 7/04;
(Continued)

(56) References Cited

U.S. PATENT DOCUMENTS

| 1,259,120 | A | * | 3/1918 | Martin | ...................... B60S 9/16 254/419 |
| 1,516,092 | A | * | 11/1924 | Gruss | ..................... B60G 15/06 267/32 |

(Continued)

FOREIGN PATENT DOCUMENTS

| CN | 107859563 A | 3/2018 |
| CN | 110469405 A | 11/2019 |

(Continued)

*Primary Examiner* — Loren C Edwards
(74) *Attorney, Agent, or Firm* — XSENSUS LLP

(57) ABSTRACT

Embodiments herein provide a vehicle-mounted gas turbine generator set, including: a chassis vehicle, a main cabin body and at least one of an air intake filter system, a ventilation filter system and an exhaust system. The chassis vehicle includes a main beam and an operator cabin. The operator cabin is located at a first side of the main beam in a first direction. The main cabin body defines a main accommodation space. A gas turbine and a generator connected with each other, and an electrical system connected with the gas turbine and the generator, are arranged in the (Continued)

main accommodation space. In a second direction perpendicular to the first direction, the main accommodation space is located between the main beam and the at least of the air intake filter system, the ventilation filter system and the exhaust system.

20 Claims, 2 Drawing Sheets

(51) Int. Cl.
    *B60G 15/12*     (2006.01)
    *B60S 9/10*     (2006.01)
    *F02C 6/00*     (2006.01)
    *F02C 7/06*     (2006.01)
    *F02C 7/24*     (2006.01)

(52) U.S. Cl.
    CPC .................. *F02C 6/00* (2013.01); *F02C 7/06* (2013.01); *F02C 7/24* (2013.01); *F05D 2220/76* (2013.01)

(58) Field of Classification Search
    CPC .......... F02C 7/06; F02C 7/24; F05D 2220/76; F05D 2230/51; F01D 15/10
    See application file for complete search history.

(56) References Cited

U.S. PATENT DOCUMENTS

| | | | | |
|---|---|---|---|---|
| 3,497,231 | A * | 2/1970 | Fulmer | B60P 3/40 |
| | | | | 280/43.23 |
| 5,309,708 | A * | 5/1994 | Stewart, Jr. | F02C 7/32 |
| | | | | 60/39.15 |
| 5,517,822 | A * | 5/1996 | Haws | F16K 11/052 |
| | | | | 122/1 R |
| 5,694,026 | A * | 12/1997 | Blanchet | F01D 15/10 |
| | | | | 322/29 |
| 6,177,868 | B1 * | 1/2001 | Hollingsworth | B60Q 9/00 |
| | | | | 180/41 |
| 2009/0311044 | A1 * | 12/2009 | Groeneweg | B60P 3/00 |
| | | | | 404/6 |
| 2018/0080376 | A1 * | 3/2018 | Austin | F02B 63/044 |
| 2019/0063262 | A1 | 2/2019 | Davis et al. | |
| 2019/0063341 | A1 * | 2/2019 | Davis | F02D 29/06 |

FOREIGN PATENT DOCUMENTS

| | | |
|---|---|---|
| CN | 110735713 A | 1/2020 |
| CN | 111412064 A | 7/2020 |
| CN | 212202251 U | 12/2020 |
| JP | 2018-048625 A | 3/2018 |

\* cited by examiner

VEHICLE-MOUNTED GAS TURBINE GENERATOR SET

The present application claims priority of Chinese Invention Patent Application No. 202010350528.7 and Chinese Utility Model Patent Application No. 202020676605.3 both filed on Apr. 28, 2020, the disclosure of which are incorporated herein by reference in its entirety as part of the present application, for all purposes.

TECHNICAL FIELD

Embodiments of the present disclosure relate to a vehicle-mounted gas turbine generator set.

BACKGROUND

A vehicle-mounted generator set is a generator set that can be moved or transported. Therefore, a vehicle-mounted power generation device can be transported to various scenarios with insufficient power or no power so as to meet demands of electric power from users.

SUMMARY

At least one embodiment of the present disclosure provides a vehicle-mounted gas turbine generator set, including: a chassis vehicle, including a main beam and an operator cabin, wherein the main beam provides a supporting surface, and the operator cabin is located at a first side of the main beam in a first direction parallel to the supporting surface; a main cabin body, arranged on the supporting surface of the main beam and defining a main accommodation space, wherein a gas turbine and a generator connected with each other, and an electrical system connected with the gas turbine and the generator, are arranged in the main accommodation space; and at least one selected from the group consisting of an air intake filter system, a ventilation filter system and an exhaust system, arranged at one side of the main cabin body away from the main beam, wherein the at least one selected from the group consisting of the air intake filter system, the ventilation filter system and the exhaust system is overlapped with each of the main cabin body and the main beam in a second direction perpendicular to the supporting surface.

In an example, a power of the gas turbine is greater than or equal to 5.3 MW.

In an example, the main cabin body includes an electrical cabin and a power cabin, and the main accommodation space includes a first accommodation space defined by the electrical cabin and a second accommodation space defined by the power cabin; in the first direction, the first accommodation space is located between the operator cabin and the second accommodation space; the electrical system is located in the first accommodation space; and the gas turbine and the generator are located in the second accommodation space.

In an example, in the second direction, the air intake filter system is overlapped with the power cabin, and the ventilation filter system is overlapped with the electrical cabin.

In an example, the chassis vehicle includes a front axle group and a rear axle group, and each of the front axle group and the rear axle group includes at least one vehicle axle; in the first direction, the rear axle group is farther away from the operator cabin than the front axle group, and at least each of the at least one vehicle axle of the rear axle group is connected with the main beam through an air spring suspension or a hydro pneumatic suspension.

In an example, an amount of the at least one vehicle axle of the front axle group is two, an amount of the at least one vehicle axle of the rear axle group is three, and each of the at least one vehicle axle of the front axle group is connected with the main beam through a leaf spring suspension.

In an example, the vehicle-mounted gas turbine generator set further includes a leveling system, wherein at least a part of the leveling system is located at one side of the main beam away from the main cabin body in the second direction; the leveling system includes a plurality of first legs, and the plurality of first legs are configured to adjust a position of at least a part of the main beam in the second direction.

In an example, each of the plurality of first legs is a hydraulic leg.

In an example, the leveling system is powered by an engine of the chassis vehicle.

In an example, the main cabin body is a soundproof cabin.

In an example, the vehicle-mounted gas turbine generator set further includes a supporting mechanism connected to the chassis vehicle and located at a second side of the main beam; the second side is opposite to the first side in the first direction; and the supporting mechanism is configured to support the exhaust system connected with the gas turbine.

In an example, the supporting mechanism includes a supporting seat and at least one second leg connected to the supporting seat.

In an example, the at least one second leg is rotatably connected to the supporting seat.

In an example, the supporting seat includes a first end and a second end opposite to each other, the at least one second leg is connected to the first end, the supporting mechanism further includes a connecting piece, the connecting piece is arranged at the second end of the supporting seat, and the supporting seat is detachably connected to the chassis vehicle through the connecting piece.

In an example, the supporting seat is rotatably connected to the chassis vehicle.

In an example, the vehicle-mounted gas turbine generator set further includes a lubrication system and a lubricant heat dissipation system connected with each other; at least a part of the lubrication system is located in the main accommodation space and configured to provide a lubricant to the gas turbine, and the lubricant heat dissipation system is configured to conduct a heat dissipation to the lubricant from the lubrication system; in the second direction, the lubricant heat dissipation system is located at one side of the main cabin body away from the main beam and is overlapped with the main cabin body; and in the first direction, the lubricant heat dissipation system is located at one side of the air intake filter system away from the ventilation filter system.

In an example, the vehicle-mounted gas turbine generator set further includes an instrument panel, an instrument ventilation system and a high-voltage junction box which are connected to the chassis vehicle; in the second direction, at least a part of each of the instrument panel, the instrument ventilation system and the high-voltage junction box is located at one side of the main cabin body facing the main beam.

In an example, in the first direction, the instrument panel is located at one side of the rear axle group away from the front axle group, and both the instrument ventilation system and the high-voltage junction box are located between the front axle group and the rear axle group.

In an example, the instrument panel, the instrument ventilation system and the high-voltage junction box are all located at a same side of the main beam in a third direction perpendicular to both of the first direction and the second direction.

In an example, the main cabin body and the at least one selected from the group consisting of the air intake filter system, the ventilation filter system and the exhaust system are integrated with the chassis vehicle into a whole in the case where the chassis vehicle is in a running state.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
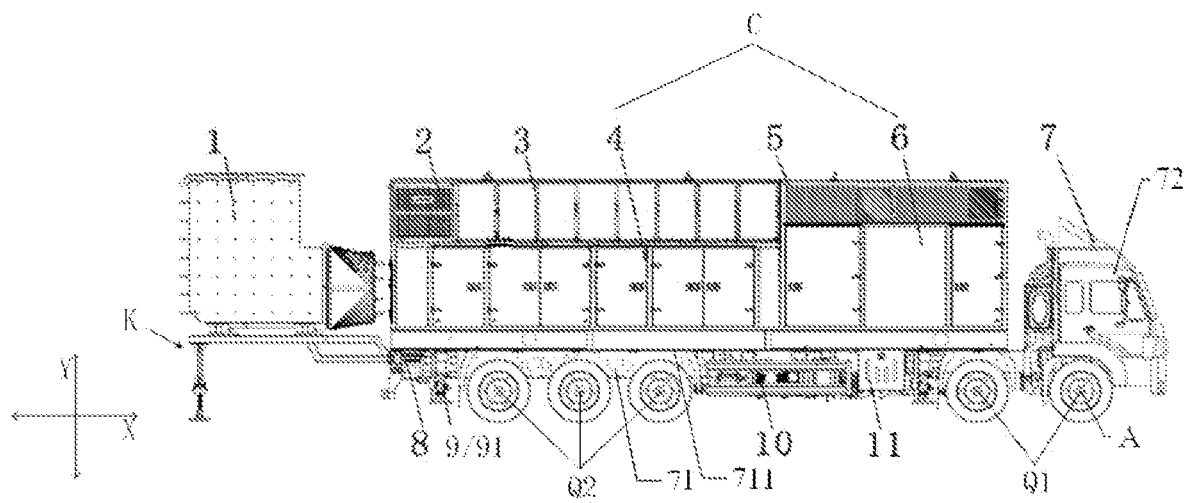
FIG. 1A is a structural side view of a vehicle-mounted gas turbine generator set provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

A vehicle-mounted generator set is either equipped with a conventional internal combustion engine as a power source or equipped with a microminiature gas turbine (a gas turbine with an output power below 1 MW) as the power source. The former is more common, while the latter is a minority. However, both the vehicle-mounted internal combustion engine and the vehicle-mounted microminiature gas turbine have a low power density and a poor output power, which results in that a plurality of vehicle-mounted generator sets are required to operate in parallel when confronted with high-power demands, thereby causing the technical problem that a large number of vehicle-mounted generator sets are on the site and occupy a large area. Moreover, there are also some technologies that apply a high-power gas turbine to the site. However, due to the large size of the high-power gas turbine and other factors, it can only be mounted in a fixed manner or a skid-mounted manner or a semitrailer-mounted manner. The fixed manner or the skid-mounted manner have higher requirements on the hardening of the site, and the site must be hardened in advance, which considerably increases the installation time in the early stage of the operation, and is time-consuming and labor-intensive. Currently, the semitrailer-mounted manner has only few cases in the industry. A semitrailer has a long length and a large turning radius, and hence involves poor trafficability and adaptability on certain roads such as rugged mountain roads. At present, under the general trend of changing from oil into electricity in oil fields, the above-mentioned vehicle-mounted manners such as the skid-mounted manner and the semitrailer-mounted manner cannot meet the requirements of rapid transportation, installation and power supply in the current industry.

Therefore, a generator set with high power density, convenient transportation and movement, as well as convenient on-site installation is needed.

At least one embodiment of the present disclosure provides a vehicle-mounted gas turbine generator set. By selecting a chassis vehicle with appropriate bearing capacity and excellent shock absorption performance, a high-power generator set is integrated onto the chassis vehicle with reasonable space optimization arrangement, so that the vehicle-mounted gas turbine generator set has high output power, convenient transportation and movement, quick on-site installation and wide adaptability.

Figure 1B:
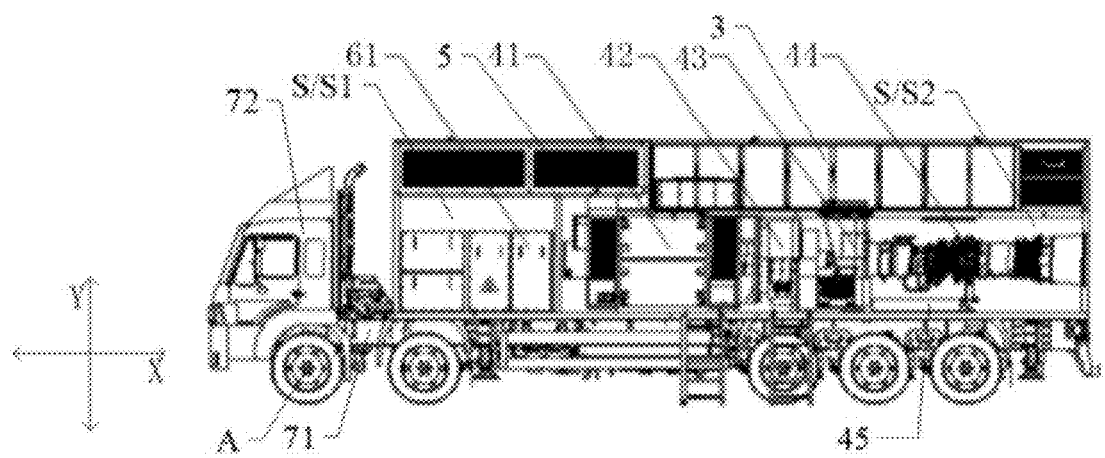
FIG. 1B is a partial cross-sectional side view of a vehicle-mounted gas turbine generator set provided by an embodiment of the present disclosure, in which some components in a main accommodation space of a main cabin body are illustrated.

As shown in FIG. 1A and FIG. 1B, the vehicle-mounted gas turbine generator set provided by the embodiment of the present disclosure includes a chassis vehicle 7, a power cabin 4, an electrical cabin 6, an air intake filter system 3, a ventilation filter system 5, an exhaust system 1 and a leveling system 9.

The power cabin 4, the electrical cabin 6, the air intake filter system 3 and the ventilation filter system 5 are arranged on the chassis vehicle 7.

The chassis vehicle 7 includes a main beam 71 and an operator cabin 72. The main beam 71 provides a supporting surface 711, and the operator cabin 72 is located at a first side (e.g., the front side) of the main beam 71 in a first direction parallel to the supporting surface 711; herein, the first direction refers to, for example, a horizontal, front-back direction X. The supporting surface 711 provided by the main beam 71 is, for example, substantially a planar surface, and can include a concave-convex structure, a hollow structure or the like, to some extent.

For example, the main beam 71 and the operator cabin 72 are non-detachable under a normal operation state of the chassis vehicle 7.

For example, an external wall of the power cabin 4 and an external wall of the electrical cabin 6 are connected integrally to be used as an external wall of a main cabin body C. The main cabin body defines a main accommodation space S. The power cabin 4 and the electrical bin 6 divide the main accommodation space S into a first accommodation space S1 defined by the electrical cabin 6 and a second accommodation space S2 defined by the power cabin 4, through a partition plate detachably connected to the external wall of the main cabin body.

The main cabin body C is arranged on the supporting surface 711 of the main beam 71.

The power cabin 4 and the electrical cabin 6 are arranged on an upper part of the chassis vehicle 7, and are located at a front end and a rear end of the main beam 71, respectively.

The air intake filter system 3 is arranged at the top of the power cabin 4, and the ventilation filter system 5 is arranged at the top of the electrical cabin 6.

A gas turbine 44, a generator 41, a gear box 42, a starter motor 43 and at least part of a lubrication system 45 are installed in the second accommodation space S2 of the power cabin 4. The gas turbine 44 is connected with the generator 41 through the gear box 42; the starter motor 43 is installed on the gear box 42; and the lubrication system 45 provides a lubricant for the gas turbine 44 and the gear box 42. The lubrication system 45 includes, for example, a lubricating pump located in the second accommodation space S2 of the power cabin 4 and a lubricant tank located outside the power cabin 4.

The ventilation filter system 5 includes a fan, a silencer and an air filter. An air outlet end of the fan is communicated with the second accommodation space S2 of the power cabin 4, and an air inlet end of the fan is connected with the silencer and the air filter.

The air intake filter system 3 is connected to an air inlet of the gas turbine 44.

For example, the gas turbine 44 and the generator 41 are connected with an electrical system 61.

The electrical system 61 is located in the first accommodation space S1 defined by the electrical cabin 6. The electrical system 61 includes, for example, a generator switching device and a starting device. The generator switching device is configured to connect the generator 41 with an external load or disconnect the generator 41 from an external load. The starting device is configured to start the gas turbine 44.

In this way, a high-power generator set is effectively integrated onto the chassis vehicle 7 through the optimized spatial arrangement of the power cabin 4, the electrical cabin 6, the air intake filter system 3 and the ventilation filter system 5.

In the above embodiment, in a second direction Y perpendicular to the supporting surface 711 of the main beam 71, the main cabin body C constituted by the power cabin 4 and the electrical cabin 6 is located between the main beam 71 and the two of the air intake filter system 3 and the ventilation filter system 5. Herein, the second direction Y is, for example, a vertical, up-down direction.

For example, in the second direction Y, the air intake filter system 3 is overlapped with the power cabin 4; and the ventilation filter system 5 is overlapped with the electrical cabin 6. However, the embodiment of the present disclosure is not limited thereto.

In another example, the exhaust system is also integrated onto the chassis vehicle. In the second direction Y, the main cabin body is located between the main beam and the three of the air intake filter system, the ventilation filter system and the exhaust system.

In yet another example, the air intake filter system is not integrated onto the chassis vehicle; and in the second direction Y, the main cabin body is located between the ventilation filter system and the main beam.

At least one selected from the group consisting of the air intake filter system 3, the ventilation filter system 5 and the exhaust system 1 is arranged at one side of the main cabin body C away from the main beam 71; and in the second direction Y perpendicular to the supporting surface 711, at least one selected from the group consisting of the air intake filter system 3, the ventilation filter system 5 and the exhaust system 1 is overlapped with each of the main cabin body C and the main beam 71.

In the case where the chassis vehicle 7 is in a running state, the main cabin body and at least one selected from the group consisting of the air intake filter system 3, the ventilation filter system 5 and the exhaust system 4 are integrated with the chassis vehicle 71 into a whole.

The chassis vehicle 7 includes a front axle group Q1 and a rear axle group Q2. Each of the front axle group Q1 and the rear axle group Q2 includes at least one vehicle axle (also referred to as axle shaft) A. In the first direction X, the rear axle group Q2 is farther away from the operator cabin 72 than the front axle group Q1.

In the present embodiment, the number of the vehicle axles A included in the front axle group Q1 of the chassis vehicle 7 is two, and each vehicle axle A included in the front axle group Q1 is connected with the main beam 7 through a leaf spring suspension; the number of the vehicle axles A included in the rear axle group Q2 is three, and each vehicle axle A included in the rear axle group Q2 is connected with the main beam 7 through an air spring suspension or a hydro pneumatic suspension. However, the embodiment of the present disclosure is not limited thereto.

In another example, each vehicle axle A included in the front axle group Q1 and the rear axle group Q2 (that is, each vehicle axle A of the chassis vehicle 7) is connected with the main beam 7 through an air spring suspension or a hydro pneumatic suspension.

In this way, by selecting the type of the chassis vehicle 7, sufficient bearing capacity and good shock absorption performance are provided for the integration of the high-power generator set.

In the second direction, at least a part of the leveling system 9 is located at one side of the main beam 71 away from the main cabin body. The leveling system 9 is used for ground leveling of the vehicle-mounted gas turbine generator set in its power generation state.

A plurality of first legs of the leveling system 9 are configured to adjust the position of at least a part of the main beam 71 in the second direction.

For example, the leveling system 9 is a hydraulic leveling system 9, that is, the first legs of the hydraulic leveling system 9 are hydraulic legs. The power of the hydraulic leveling system 9 is provided, for example, by the engine of the chassis vehicle 7.

In another example, the first legs 91 of the leveling system 9 can be mechanical legs.

For example, the hydraulic leveling system 9 includes four hydraulic legs (first legs) 91 which are respectively arranged at the front end and the rear end of the chassis vehicle 7, and each of the front end and the rear end of the chassis vehicle 7 is provided with two of the hydraulic legs. The two hydraulic legs 91 at the front end are respectively distributed on the left side and the right side of the chassis vehicle 7, and the two hydraulic legs 91 at the rear end are respectively distributed on the left side and the right side of the chassis vehicle 7. The engine of the chassis vehicle 7 drives the four hydraulic legs, so as to realize the leveling of the chassis vehicle 7 with respect to the ground, which can achieve the stability of the chassis vehicle 7 under the operation state without the need of hardening the ground. Furthermore, the installation is quick, time-saving and labor-saving. It can be understood that the embodiment of the present disclosure does not limit the number of the hydraulic legs 91 included in the hydraulic leveling system 9.

The cabin body of the power cabin 4 and the cabin body of the electrical cabin 6 are subjected to a soundproof treatment. The soundproof treatment is to add a sound insulating material such as sound-absorbing cotton, microporous structure, aluminum silicate salt cotton and glass fiber cotton, etc., onto cabin walls of the power cabin 4 and the electrical cabin 6. In this way, the main cabin body C constituted by the power cabin 4 and the electrical cabin 6 is a soundproof cabin. It is also possible to add an external cabin body outside the power cabin 4 and the electrical cabin 6, and a soundproof treatment can be performed on the external cabin body to make the external cabin body a soundproof cabin.

A sound insulation and noise reducing treatment can also be performed on the air intake filter system 3 and the ventilation filter system 5 correspondingly, so as to realize a low-noise operation of the vehicle-mounted gas turbine generator set on the site.

Figure 2:
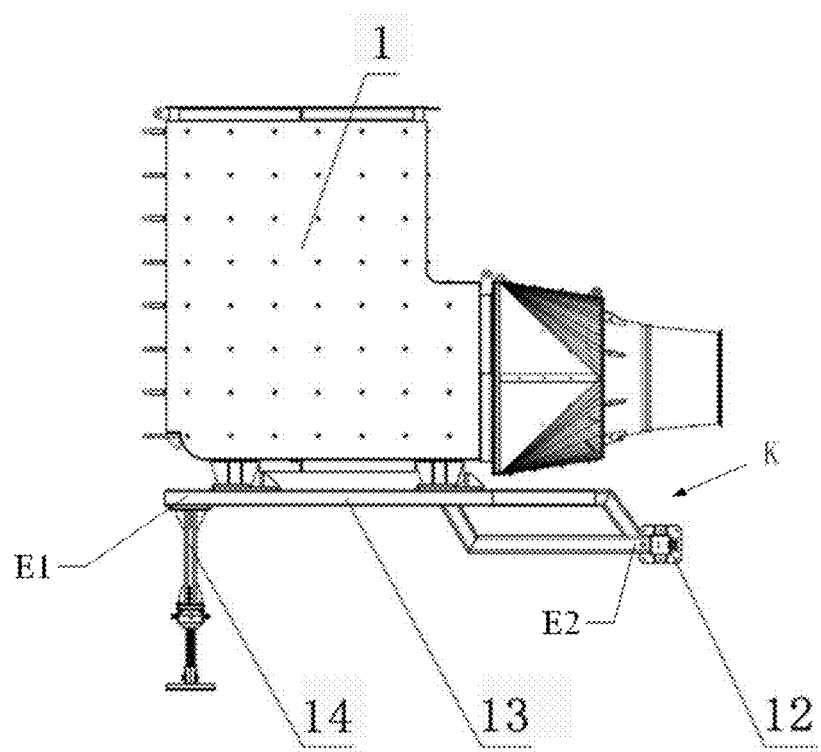
FIG. 2 is a structural diagram illustrating an installation of an exhaust system in a vehicle-mounted gas turbine generator set provided by an embodiment of the present disclosure.

Referring to FIG. 1A and FIG. 2, the exhaust system 1 is connected with the chassis vehicle 7 through a supporting mechanism K. The exhaust system 1 is connected to an air outlet of the gas turbine 44.

The supporting mechanism K is located at a second side of the main beam 71. In the first direction, the second side of the main beam 71 is opposite to the first side of the main beam 71.

The supporting mechanism K includes at least one leveling leg (the second leg) 14, a supporting seat 13 and a connecting piece 12. One end E2 of the supporting seat 13 is detachably connected with the chassis vehicle 7 through the connecting piece 12; the bottom of the other end E1 of the supporting seat 13 is connected to the leveling leg 14; and the supporting seat 13 is used for bearing the exhaust system 1. During an installation operation on the site, the exhaust system 1 can be hoisted.

In FIG. 1B, neither the supporting mechanism K nor the exhaust system 1 is connected to the chassis vehicle 7.

For example, the leveling leg 14 can be folded. In the case where the vehicle-mounted gas turbine generator set is in a transportation state, the leveling leg 14 is in a folded state; and the leveling leg 14 is rotatably connected with the supporting seat 13, for example, by a hinge pin. In the case where the vehicle-mounted gas turbine generator set is in a non-transportation state, the leveling leg 14 can be rotated and lowered to support the exhaust system 1. The leveling leg 14 can be, for example, a hydraulic leg or a mechanical leg.

For example, the supporting seat 13 is rotatably connected to the chassis vehicle 7. In this way, in the case where the vehicle-mounted gas turbine generator set is in a transportation state, the supporting seat 13 can be rotated to a substantially vertical state so as to travel with the chassis vehicle 7.

With continued reference to FIG. 1A and FIG. 1B, the vehicle-mounted gas turbine generator set further includes a lubricant heat dissipation system 2 connected with the lubrication system 45. The lubricant heat dissipation system 2 is configured to perform a heat dissipate to the lubricant from the lubrication system 45.

For example, in the second direction Y, the lubricant heat dissipation system 2 is located at one side of the main cabin body away from the main beam 71.

For example, in the first direction X, the lubricant heat dissipation system 2 is located at one side of the air intake filter system 3 away from the ventilation filter system 5.

The vehicle-mounted gas turbine generator set further includes an instrument panel 8, an instrument ventilation system 10 and a high-voltage junction box 11.

The instrument panel 8, the instrument ventilation system 10 and the high-voltage junction box 11 are respectively arranged at the lower part of the chassis vehicle 7. At least a part of each of the instrument panel 8, the instrument ventilation system 10 and the high-voltage junction box 11 is located at one side of the main cabin body facing the main beam 71.

The lubricant heat dissipation system 2 is arranged at the top of the power cabin 4, and the lubricant heat dissipation system 2 is arranged in parallel with the air intake filter system 3.

The high-voltage junction box 11 is configured as a high-voltage output of the vehicle-mounted gas turbine generator set, and the instrument panel 8 is configured to display a pipeline pressure of a gas circuit and an oil circuit in the instrument ventilation system 10.

For example, the instrument ventilation system 10 is connected with the gas turbine. The instrument ventilation system 10 is configured to supply air to, for example, components in the power cabin 4.

The instrument panel 8, the instrument ventilation system 10 and the high-voltage junction box 11 are respectively arranged on a side of the chassis vehicle 7. The instrument panel 8 is arranged at the rear of the chassis vehicle 7, the high-voltage junction box 11 is arranged close to the headstock of the chassis vehicle 7, and the instrument ventilation system 10 is arranged adjacent to the high-voltage junction box 11.

For example, in the first direction X, the instrument panel 8 is located at one side of the rear axle group Q2 away from the front axle group Q1, and both the instrument ventilation system 10 and the high-voltage junction box 11 are located between the front axle group Q1 and the rear axle group Q2.

For example, in a third direction perpendicular to both of the first direction X and the second direction Y, the instrument panel 8, the instrument ventilation system 10 and the high-voltage junction box 11 are all located at a same side of the main beam 71. Herein, the third direction is, for example, a horizontal left-right direction.

The power of the gas turbine is greater than 5.3 MW. The gas turbine can use wellhead gas as the fuel on the site.

In this way, by selecting a chassis vehicle with appropriate bearing capacity and excellent shock absorption performance (for example, the front two axles of the chassis vehicle adopt a leaf spring suspension, and the rear three axles adopt an air spring suspension), sufficient bearing capacity is provided for the integration of the high-power generator set, and the high-power generator set can be effectively integrated onto the chassis vehicle with reasonable arrangement of the space on the chassis vehicle and the space under the chassis vehicle. The gas turbine with a power of 5.3 MW provides guarantee for high power output. The vehicle-mounted manner by using a chassis vehicle provides flexibility, rapidity and convenience for transportation and movement, and can also be adapted to different wellsite roads so that both flat and wide roads as well as rugged mountain roads can be passed through well. The installation time on the site is shorter, and the installation can be completed merely by driving the chassis vehicle to a designated position, using the leveling system to level the ground under a working condition, and hoisting the exhaust system.

At least one embodiment of the present disclosure provides a vehicle-mounted gas turbine generator set, which includes a chassis vehicle, a power cabin, an electrical cabin, an air intake filter system, a ventilation filter system and a hydraulic leveling system. The power cabin, the electrical cabin, the air intake filter system and the ventilation filter system are arranged on the chassis vehicle; the hydraulic leveling system is arranged on both sides of the lower part of the chassis vehicle; the power cabin and the electrical cabin are respectively arranged at both ends of the chassis vehicle; the air intake filter system is arranged at the top of the power cabin; the ventilation filter system is arranged at the top of the electrical cabin; and a gas turbine, a generator, a gear box and a starter motor are installed in the power cabin.

In an example, the front two axles of the chassis vehicle adopt a leaf spring suspension, and the rear three axles adopt an air spring suspension.

In an example, the power of the hydraulic leveling system is provided by the engine of the chassis vehicle, and the hydraulic leveling system is used for leveling the ground when the vehicle-mounted gas turbine generator set in the operation state.

In an example, the cabin body of the power cabin and the cabin body of the electrical cabin are subjected to a soundproof treatment.

In an example, the vehicle-mounted gas turbine generator set includes an exhaust system, and the exhaust system is connected with the chassis vehicle through a supporting mechanism.

In an example, the supporting mechanism includes a leveling leg, a supporting seat and a connecting piece, one end of the supporting seat is connected with the chassis vehicle through the connecting piece, a bottom of the other end of the supporting seat is connected with the leveling leg, and the supporting seat is used for bearing the exhaust system.

In an example, the leveling leg can be folded in a transportation state.

In an example, the vehicle-mounted gas turbine generator set includes an instrument panel, an instrument ventilation system, a high-voltage junction box and a lubricant heat dissipation system. The instrument panel, the instrument ventilation system and the high-voltage junction box are respectively arranged at the lower part of the chassis vehicle; the lubricant heat dissipation system is arranged at the top of the power cabin; and the lubricant heat dissipation system is arranged in parallel with the air intake filter system.

In an example, the instrument panel, the instrument ventilation system and the high-voltage junction box are respectively arranged on a side of the chassis vehicle.

In an example, the power of the gas turbine is greater than 5.3 MW.

In an example, the lubrication system is installed in the power cabin.

It should be understood by those skilled in the art that the present disclosure is not limited by the above-mentioned embodiments. The above-mentioned embodiments and descriptions only illustrate the principles of the present disclosure. Various modifications and improvements may be made without departing from the spirit and scope of the present disclosure, and these modifications and improvements fall within the protection scope of the present disclosure. The claimed protection scope of the present disclosure is defined by the append claims and equivalents thereof.

What is claimed is:

1. A vehicle-mounted gas turbine generator set, comprising:
   a chassis vehicle, comprising a main beam and an operator cabin, wherein the main beam provides a supporting surface, and the operator cabin is located at a first side of the main beam in a first direction parallel to the supporting surface;
   a main cabin body, arranged on the supporting surface of the main beam and defining a main accommodation space, wherein a gas turbine and a generator connected with each other through a gear box, a starter motor installed on the gear box, and an electrical system connected with the gas turbine and the generator, are arranged in the main accommodation space, and a lubrication system including a lubricating pump and a lubricant tank for providing a lubricant for the gas turbine and the gear box is installed directly underneath the gas turbine in a second direction perpendicular to the supporting surface; and
   an air intake filter system and a ventilation filter system comprising a fan, a silencer and an air filter are arranged at one side of the main cabin body away from the main beam and the air intake filter system is in direct contact with the ventilation filter system,
   wherein at least one selected from the group consisting of the air intake filter system, the ventilation filter system and an exhaust system is overlapped with each of the main cabin body and the main beam in the second direction perpendicular to the supporting surface,
   the electrical system comprises a generator switching device and a starting device, which are arranged in a portion of the main accommodation space directly underneath the ventilation filter system, and
   a lubricant heat dissipation system connected to the lubrication system is provided above the main cabin body and on a side of the gas turbine opposite from the lubrication system in the second direction, the lubricant heat dissipation system and the air intake filter system are arranged in parallel and a side surface of the lubricant heat dissipation system perpendicular to the supporting surface is in direct contact with a side surface of the air intake filter system perpendicular to the supporting surface in the first direction and, in a plan view, the lubricant heat dissipation system completely overlaps with the main cabin body and does not overlap with the air intake filter system.

2. The vehicle-mounted gas turbine generator set according to claim 1, wherein a power of the gas turbine is greater than or equal to 5.3 MW.

3. The vehicle-mounted gas turbine generator set according to claim 1, wherein the main cabin body comprises an electrical cabin and a power cabin, and the main accommodation space comprises a first accommodation space defined by the electrical cabin and a second accommodation space defined by the power cabin, in the first direction, the first accommodation space is located between the operator cabin and the second accommodation space; the electrical system is located in the first accommodation space; and the gas turbine and the generator are located in the second accommodation space.

4. The vehicle-mounted gas turbine generator set according to claim 3, wherein the second direction, the air intake filter system is overlapped with the power cabin, and the ventilation filter system is overlapped with the electrical cabin.

5. The vehicle-mounted gas turbine generator set according to claim 1, wherein the chassis vehicle comprises a front axle group and a rear axle group, and each of the front axle group and the rear axle group comprises at least one vehicle axle, in the first direction, the rear axle group is farther away from the operator cabin than the front axle group, and at least each of the at least one vehicle axle of the rear axle group is connected with the main beam through an air spring suspension or a hydro pneumatic suspension.

6. The vehicle-mounted gas turbine generator set according to claim 5, wherein an amount of the at least one vehicle axle of the front axle group is two, an amount of the at least one vehicle axle of the rear axle group is three, and each of the at least one vehicle axle of the front axle group is connected with the main beam through a leaf spring suspension.

7. The vehicle-mounted gas turbine generator set according to claim 6, further comprising an instrument panel, an instrument ventilation system and a high-voltage junction box which are connected to the chassis vehicle, wherein in the second direction, at least a part of each of the instrument panel, the instrument ventilation system and the high-voltage junction box is located at one side of the main cabin body facing the main beam.

8. The vehicle-mounted gas turbine generator set according to claim 7, wherein in the first direction, the instrument panel is located at one side of the rear axle group away from the front axle group, and both the instrument ventilation system and the high-voltage junction box are located between the front axle group and the rear axle group.

9. The vehicle-mounted gas turbine generator set according to claim 7, wherein the instrument panel, the instrument ventilation system and the high-voltage junction box are all located at a same side of the main beam in a third direction perpendicular to both of the first direction and the second direction.

10. The vehicle-mounted gas turbine generator set according to claim 1, further comprising a leveling system, wherein at least a part of the leveling system is located at one side of the main beam away from the main cabin body in the second direction, the leveling system comprises a plurality of first legs, and the plurality of first legs are configured to adjust a position of at least a part of the main beam in the second direction.

11. The vehicle-mounted gas turbine generator set according to claim 10, wherein each of the plurality of first legs is a hydraulic leg.

12. The vehicle-mounted gas turbine generator set according to claim 11, wherein the leveling system is powered by an engine of the chassis vehicle.

13. The vehicle-mounted gas turbine generator set according to claim 1, wherein the main cabin body is a soundproof cabin.

14. The vehicle-mounted gas turbine generator set according to claim 1, further comprising: a supporter connected to the chassis vehicle and located at a second side of the main beam, wherein the second side is opposite to the first side in the first direction, and the supporter supports the exhaust system connected with the gas turbine.

15. The vehicle-mounted gas turbine generator set according to claim 14, wherein the supporting mechanism comprises a supporting seat and at least one second leg connected to the supporting seat.

16. The vehicle-mounted gas turbine generator set according to claim 15, wherein the at least one second leg is rotatably connected to the supporting seat.

17. The vehicle-mounted gas turbine generator set according to claim 15, wherein the supporting seat comprises a first end and a second end opposite to each other, the at least one second leg is connected to the first end, the supporting mechanism further comprises a connecting piece, the connecting piece is arranged at the second end of the supporting seat, and the supporting seat is detachably connected to the chassis vehicle through the connecting piece.

18. The vehicle-mounted gas turbine generator set according to claim 15, wherein the supporting seat is rotatably connected to the chassis vehicle.

19. The vehicle-mounted gas turbine generator set according to claim 1, wherein the lubricant heat dissipation system is configured to conduct a heat dissipation to the lubricant from the lubrication system, and in the first direction, the lubricant heat dissipation system is located at one side of the air intake filter system away from the ventilation filter system.

20. The vehicle-mounted gas turbine generator set according to claim 1, wherein the main cabin body and the at least one selected from the group consisting of the air intake filter system, the ventilation filter system and the exhaust system are integrated with the chassis vehicle into a whole in the case where the chassis vehicle is in a running state.

* * * * *